United States Patent

Seki et al.

[11] Patent Number: 5,963,451
[45] Date of Patent: Oct. 5, 1999

[54] CAD/CAM SYSTEM FOR AUTOMATIC RE-CREATION OF A CUTTER PATH

[75] Inventors: Masaki Seki, Suginami-ku; Hidenori Meguro, Hino, both of Japan

[73] Assignee: Fanuc Ltd, Yamanashi, Japan

[21] Appl. No.: 08/843,493

[22] Filed: Apr. 16, 1997

Related U.S. Application Data

[63] Continuation of application No. 08/196,148, filed as application No. PCT/JP93/00842, Jun. 22, 1993, abandoned.

[30] Foreign Application Priority Data

Jun. 22, 1992 [JP] Japan ................................. 4-185704

[51] Int. Cl.⁶ ..................................................... G06F 19/00
[52] U.S. Cl. ............................... 364/474.24; 364/474.02; 364/192; 364/474.25; 364/474.26
[58] Field of Search ..................... 364/191, 192, 364/474.22, 474.24, 474.26, 474.25; 395/120

[56] References Cited

U.S. PATENT DOCUMENTS

| | | | |
|---|---|---|---|
| 4,891,763 | 1/1990 | Kuriyama | 364/192 X |
| 4,945,498 | 7/1990 | Mitamura | 364/521 |
| 5,043,865 | 8/1991 | Seki et al. | 364/192 |
| 5,065,332 | 11/1991 | Seki et al. | 364/192 X |
| 5,115,400 | 5/1992 | Watanabe et al. | 364/474.24 |
| 5,388,199 | 2/1995 | Kakazu et al. | 395/155 |

FOREIGN PATENT DOCUMENTS

| | | |
|---|---|---|
| 2 646 725 | 11/1990 | France . |
| A 60-191305 | 9/1985 | Japan . |
| A 61-136103 | 6/1986 | Japan . |
| 1-261709 | 4/1988 | Japan . |
| A 63-292607 | 11/1988 | Japan . |
| A-63-293607 | 11/1988 | Japan . |
| 4-114207 | 9/1990 | Japan . |
| A 3-266104 | 11/1991 | Japan . |

OTHER PUBLICATIONS

VDI Zeitschrift, vol. 134, May 1992, Special CAD/CAM, Dusseldorf DE, pp. 22, 25–27, 30, D. Bohle et al "Einsatz von CAD/CAM Im Entwicklungsverbund Zweiwer Partnerunternehmen".

Manufacturing Technology International (1987) Europe, No. 1, pp. 66–69, "The design of a database management system for CIM".

*Primary Examiner*—William Grant
*Assistant Examiner*—Sheela S. Rao
*Attorney, Agent, or Firm*—Staas & Halsey

[57] ABSTRACT

A CAD/CAM system arranged so that a re-creation processing for a cutter path is automatically executed by a CAM system when a curved surface is modified by a CAD system. Functions for the cutter path re-creation processing are provided by utilizing a customizing function of the CAD system. In executing computation for the cutter path and in originating NC data, references for assigning the functions are previously set for the curved surface. When the shape of the curved surface is modified on the CAD side after the NC data has been created, the CAM is invoked to invoke the aforesaid functions. Perceiving this invocation, the CAM executes the cutter path re-creation processing by using machining condition data set for the unmodified curved surface, on the basis of the invoked functions. Thus, the cutter path for the modified curved surface is created immediately by the CAM when the curved surface is modified by the CAD.

16 Claims, 5 Drawing Sheets

CAD/CAM SYSTEM FOR AUTOMATIC RE-CREATION OF A CUTTER PATH

This application is a continuation of application Ser. No. 08/196,148, filed Feb. 22, 1994, now abandoned which is a 371 of PCT/JP93/00842 filed Jun. 22, 1993.

BACKGROUND OF THE INVENTION

1. Field of the Invention

The present invention relates to a method for defining a shape by a CAD system, defining machining by a CAM system, and making computation for a cutter path for the shape machining, thereby originating NC data, and more particularly, to a CAD/CAM system by which a cutter path for a modified shape can automatically be recreated on the CAM side immediately when the shape is modified by the CAD.

2. Description of the Related Art

The CAD (Computer-Aided Design) system and CAM (Computer-Aided Manufacturing) system have been developed and advanced separately. Referring to FIG. 1, in order to integrate these two systems, therefore, graphic data of which shapes were defined by a CAD system 1 is delivered to a CAM system after being first transformed into intermediate data 3 represented in a format such as IGES (Initial Graphics Exchange Specification) or DXF (Drawing Interchange File), as shown in FIG. 1. Based on this intermediate data 3, the CAM system makes computation for a cutter path and the like, thereby originating NC data and other data. In FIG. 1, M1 designates a memory in the CAD system 1, which is stored with the graphic data and the like originated by the CAD. Further, M2 designates a memory in the CAM system 2, which is stored with the graphic data, NC data, etc. originated by the CAM system 2.

As described above, the CAD side and the CAM side are coupled by the intermediate data, so that the CAM system 2 can learn the graphic data defined by the CAD system 1, but, it cannot be informed of any contents of the operation such as modification that the CAD system has executed afterward for the graphic form.

On the other hand, a computer system is generally provided with a customizing function (that is, a function which enables a user to add functions and the like). Accordingly, the CAD system is also provided with the customizing function. The use of this customizing function obviates the necessity of the intermediate data 3 for the transfer of the graphic data between the CAD system and the CAM system, and enables the CAM system 2 to access the data base of the CAD system 1.

FIG. 2 is a block diagram showing a CAD/CAM system in which the CAD system 1 has the aforesaid customizing function and then requires no use of the intermediate data 3. In this case, the CAD system 1 is additionally provided with a customizing function 4, and the CAM system 2 can directly access the data base of the CAD system 1 and make computation for a cutter path, thereby originating the NC data, by utilizing the customizing function 4. As shown in FIG. 2, the memory M1 of the CAD system 1 is loaded with the graphic data defined by the CAD system 1 and the NC data originated on the side of the CAM system 2, while the memory section M2 of the CAM system is loaded with data for machining definition defined in order to originate the NC data and the originated NC data.

In originating the NC data by a conventional CAD/CAM system such as the one shown in FIG. 2, when the graphic form is modified by the CAD system 1 after the NC data has been created, disagreement naturally occurs between the modified graphic form and the cutter path unless an operator gives a command for recomputation of the cutter path in accordance with the modified graphic form. Thus, there is a possibility that machining is erroneously effected by the unmodified NC data, despite the modification of the graphic form.

Referring now to FIGS. 4(a)–4(c) showing states displayed on a CRT display screen, the conventional procedure of operation covering from the definition of the graphic form by the CAD system to the NC data origination by the CAM system will be described.

First, the shape of an object of machining is defined by the CAD system 1. In the example shown in FIG. 4, four spline curves with ID codes entID1 to entID4 are first defined. A curved surface srfID1 is then formed through combination of these four curves and the curved surface srfID1 is then assigned an ID code. Thereupon, the curved surface srfID1 composed of the four spline curves entID1 to entID4 is displayed on the CRT screen, as shown in FIG. 4(a). Then, the graphic data are delivered to the CAM system 2.

When the CAM system 2 to receives the graphic data having the assigned ID codes, on the other hand, the shape of the curved surface srfID1 is drawn on the CRT screen of the CAM system 2, as shown in FIG. 4(b). If the definition of the machining is selected on the CRT screen, an input command picture for machining conditions appears in a window form, and an accessible state for input is established. When data for the machining definition, including the tool feed speed, starting point of machining, pitch, tool shape, cutting path pattern, etc., and a cutter path computation command are inputted, the CAM system 2 computes a cutter path pas1 in accordance with the inputted conditions and displays it on the CRT screen, as show in FIG. 4(c). As the cutter path pas1 is computed, the NC data are originated.

When the graphic form is modified by the CAD system 1 after the cutter path is computed to originate the NC data in the manner described above, this naturally causes a phenomenon that the modified graphic form disagrees with the cutter path data and NC data unless commands are given again for cutter path computation and NC data origination. FIGS. 5(a) and 5(b) are diagrams for illustrating this situation. As shown in FIG. 5(a), when the cutter path computation is completed for the curved surface srfID1 cutter path pas1 is displayed on the CRT screen of the CAM system 2 graphic form is then modified into srfID1' from srfID1 by the CAD system and then displayed on CAM system 2, as shown in FIG. 5(b), there will be disagreement between the graphic data (curved surface data) and cutter path pas 1. This causes thereby an inconsistency between these data. In order to eliminate this inconsistency, the cutter path computation must be executed again in accordance with the modified graphic data, i.e. the cutter path computation command must again be applied to the CAM system after inputting the modified graphic data by using the CRT input command picture.

SUMMARY OF THE INVENTION

The object of the present invention is to provide a CAD/CAM system for automatic cutter path re-creation such that cutter path computation and NC data origination are automatically executed when a graphic form having already undergone cutter path computation and NC data origination is modified by means of a CAD system.

In order to achieve the above object, according to an aspect of the present invention, set machining condition data are previously stored when a cutter path is computed and NC data are originated for a shape created by a CAD system, and commands for the cutter path computation and the NC data origination are previously and automatically set in a CAM system when modification of the shape is executed by the CAD system, so that the cutter path computation and the NC data origination are automatically executed for the modified shape on the basis of the stored machining condition data in response to the set commands for the cutter path computation and the NC data origination when the shape is modified by the CAD system.

According to another aspect of the present invention, moreover, a CAD/CAM system comprises a CAD system for defining a curved surface relating to the creation of a cutter path, and a CAM system for defining the shape of the defined curved surface and machining for cutter path computation, thereby originating NC data; in this CAD/CAM system, the CAD system includes a customizing function including function for assigning ID codes to the curved surface and curved surface elements, individually, ability for originally providing functions to be invoked for the execution of a cutter path re-creation processing on the basis of a key-input for curved surface modification processing completion, memory means for storing data on the curved surface and the curved surface elements, the ID codes assigned thereto, and references set for the curved surface in order to assign the functions provided in the aforesaid manner, means for determining whether or not the references for the curved surface are set in the memory means in response to the curved surface modification completion input, and means for invoking the functions assigned by the references, thereby invoking the CAM system, if it is concluded that the references are set; while the CAM system includes memory means for storing a cutter path computation result list, the originated NC data, and machining condition data, and means for reading out the machining condition data from the aforesaid memory means in response to the invocation from the CAD, re-originating the NC data by executing the cutter path re-creation processing invoked by the assigned functions, and storing the memory means with the re-originated NC data updated for renewal.

According to still another aspect of the present invention, functions to be invoked for cutter path re-creation are previously provided by means of a customizing function attached to a CAD system; memory means of a CAM system is previously stored with machining condition data when executing a cutter path creation processing by means of the CAM system for a curved surface set by the CAD system; references for assigning the functions are set for the curved surface; and memory means of the CAD system is stored with the set references; whether or not the references for the curved surface are set in the memory means of the CAD system is determined when the curved surface is modified in the CAD system, and an input for modification completion is made; the functions thus provided and assigned by the references are invoked, thereby causing the CAD system to invoke the CAM system, when the references are set for the curved surface as an object of the modification; the CAM system, upon perceiving the invocation from the CAD system, execute a processing for cutter path re-creation, specified by the invoked functions, for the modified curved surface; and the memory means of the CAM system is stored with NC data originated by the cutter path re-creation processing, which is updated for renewal, in accordance with an ID code for the unmodified curved surface.

According to the present invention, as described above, the shape is defined by the CAD system; the machining conditions are set for the shape defined by the CAM system; and the cutter path computation is made to originate the NC data. In so doing, the set machining conditions are stored beforehand. If this shape is modified by the CAD system, the commands for the cutter path computation and the NC data origination are automatically set in advance. If the shape, with which the NC data has already been originated, is modified by the CAD system, the cutter path computation and the NC data origination are automatically executed for the modified shape by using the stored machining conditions. Thus, there will be no disagreement between the modified shape and the cutter path.

DETAILED DESCRIPTION OF THE PREFERRED EMBODIMENTS

Figure 1:
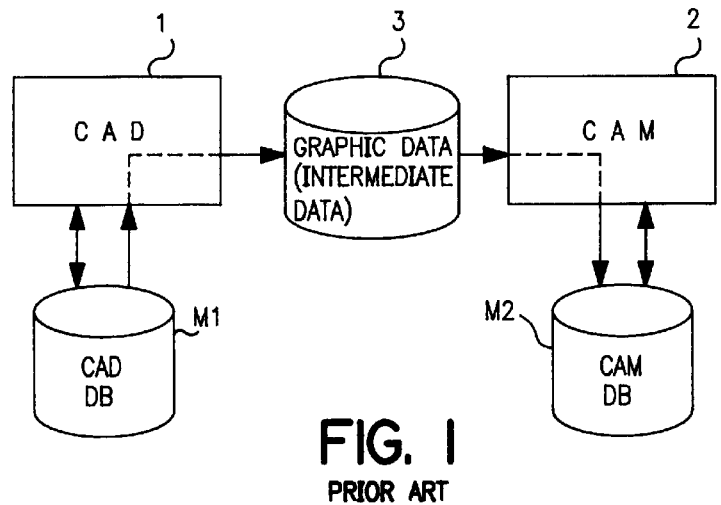
FIG. 1 is a diagram for illustrating a conventional CAD/CAM system.
Figure 2:
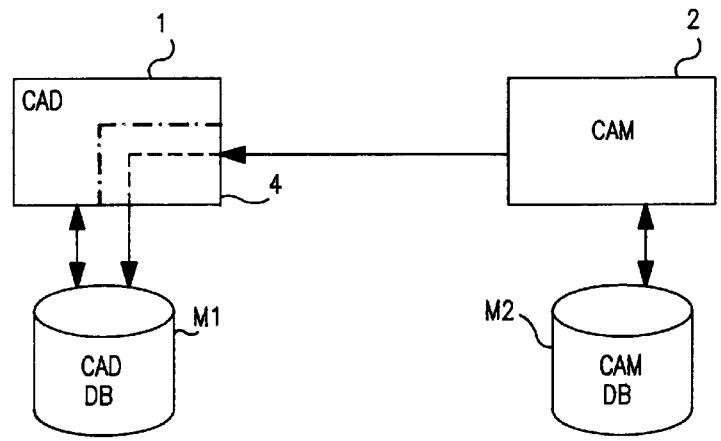
FIG. 2 is a diagram for illustrating a CAD/CAM system in which a CAD system has a customizing function.

A CAD/CAM system itself according to the present invention begins with a conventional one in which a CAD system is furnished with a customizing function such as the one shown in FIG. 2. However, the present invention is characterized in that the customizing function is utilized for automatically executing cutter path computation and origination of NC data when a graphic form is modified by the CAD system.

Figure 3:
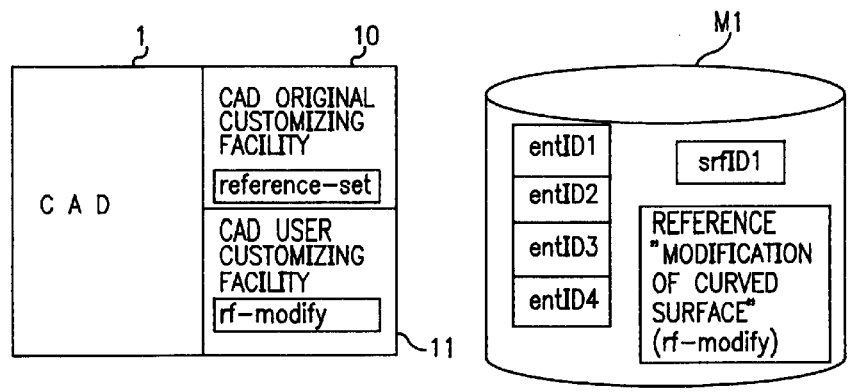
FIG. 3 is a diagram for illustrating a CAD system according to one embodiment of the present invention.

FIG. 3 is a diagram for illustrating the customizing function of a CAD system, utilized according to one embodiment of the present invention, and a CAD data base. This customizing function is composed of a CAD original customizing function 10, which is originally provided with functions (e.g., a "reference-set") for setting references for graphic elements, such as curved surfaces (srfID) and curved lines (entID) forming the curved surfaces. Original customizing function 10 is similar to the customizing function of the prior art. The present customizing function also includes a CAD user customizing function 11, which is designed so that the user a person who constructs the (CAM constructor) can originally create functions (e.g., such as "rf-modify") to be invoked for a cutter path re-creation processing (cutter path computation and re-origination of NC data) when an operation for "CURVED SURFACE MODIFICATION" is performed for specific graphic elements (e.g., reference-defined curved surface srfID1). Of course, the customizing function also allows the user to create various function of his own.

Figure 4A:
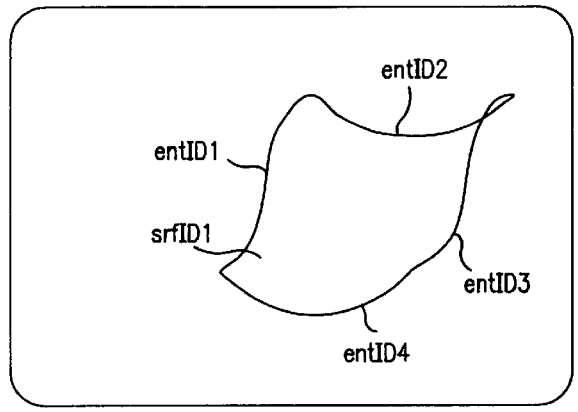
FIGS. 4a–4c are diagrams for illustrating the relationships between a shape created by the CAD/CAM system and a cutter path.

For example, as shown in FIG. 4(a), when the curved surface srfID1 formed by the spline curves entID1 to entID4 is defined, the data base of the CAD system 1 is stored with data for spline curves entID1 to entID4, their ID codes and data (batch data and batch display data) for the curved surface srfID1 and the ID code for curved surface srfID1. The CAD system 1 also stores references, such as references which are set so as to assign functions to be invoked i.e. ("rf-modify") for the cutter path re-creation processing when the modifying operation is performed for that curved surface. In general, a reference is any mark or index attached to the graphic data created by the CAD system. In particular, a reference may also be later created and attached to the graphic data to invoke a function, such as "rf-modify" set forth above.

Figure 6:
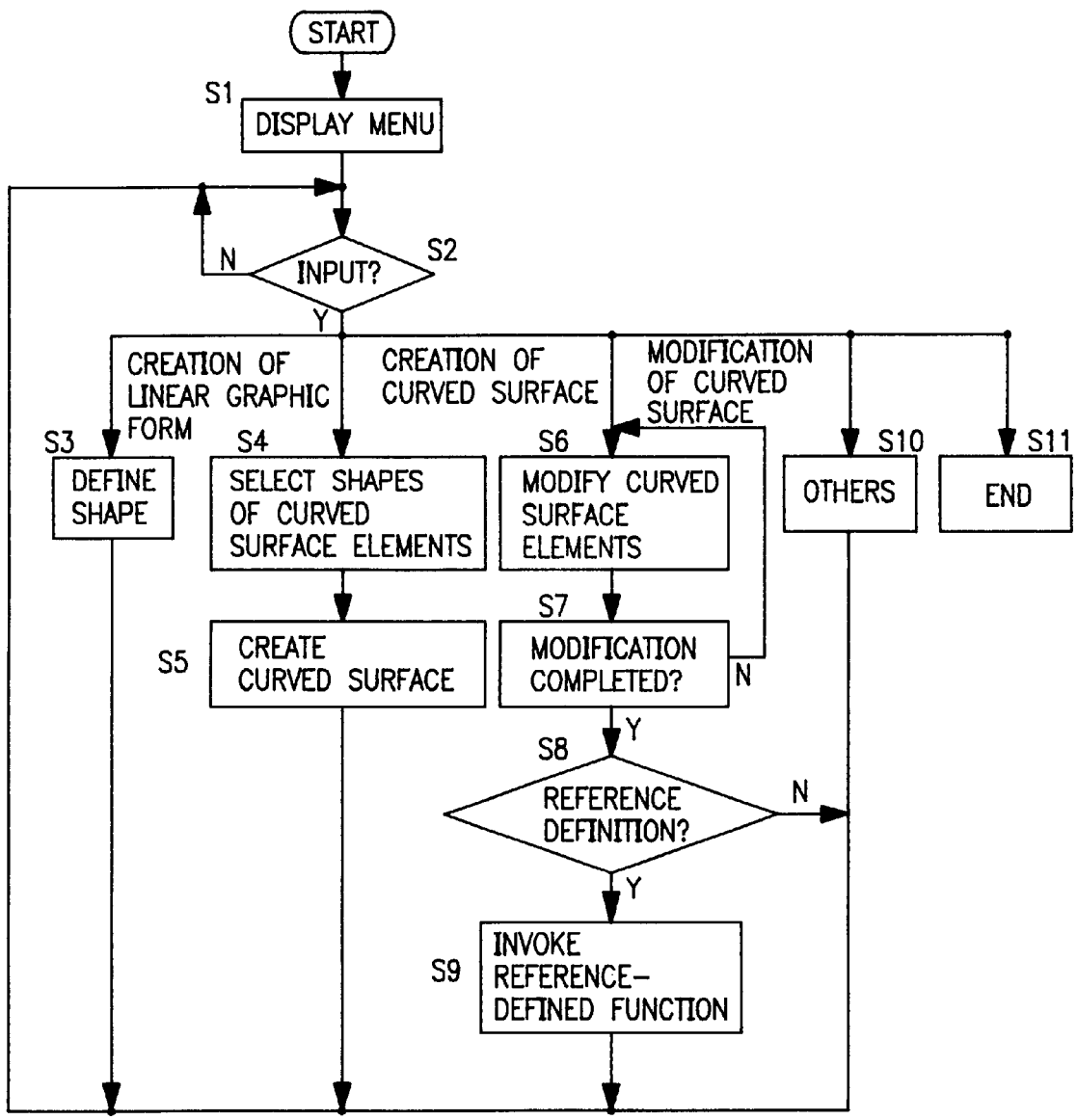
FIG. 6 is a flow chart showing processings executed by a processor of the CAD system according to the one embodiment of the present invention.

FIG. 6 is a flow chart showing processings to be executed by a processor of the CAD system according to the present embodiment.

Figure 4B:
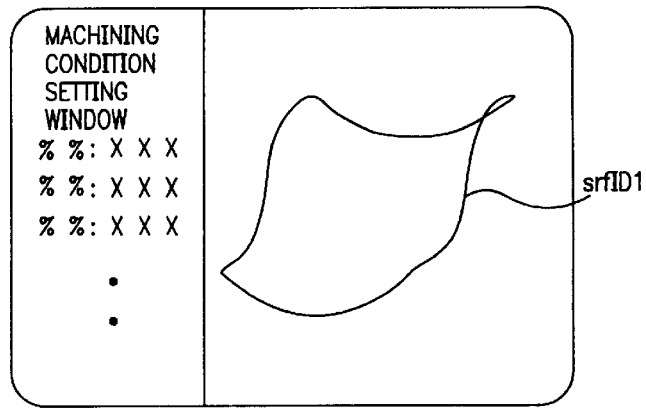
Figure 4C:
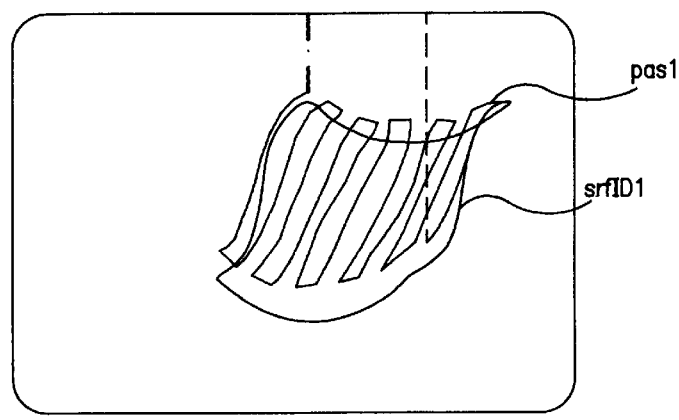

When the system is first actuated, the processor of the CAD system displays an operation menu, and stands by until a choice from the menu is made by means of soft keys (Steps S1 and S2). When "CREATION OF LINEAR GRAPHIC FORM" is selected from the menu, a linear graphic creation processing is executed (Step S3). In this processing, as in the conventional case, linear graphic forms, such as a straight line, circular arc, spline curve, and hyperbolic curve, polyline, etc., are defined. If the curved surface srfID1 shown in FIG. 4 is to be inputted, for example, the four spline curves entID1 to entID4 are created, i.e. defined, and inputted. Subsequently, when "CREATION OF CURVED SURFACE" is selected from the menu, and elements constituting the curved surface are selected, a curved surface creation processing is executed in the same manner as in the conventional case (Steps S4 and S5). In creating the curved surface srfID1, as shown in FIG. 4(a), aforementioned the four spline curves entID1 to entID4 are selected, and the curved surface srfID1 is defined by these four spline curves.

When "MODIFICATION OF CURVED SURFACE" is selected from the menu, the curved surface to be modified is ID code, and modification of elements which constitute the curved surface is then executed. When a modification completion input is made (Steps S6 and S7), it is determined whether or not the aforesaid references are set for this curved surface, that is, whether or not the references are set for assigning the functions to be invoked for the automatic cutter path re-creation processing when the curved surface is subjected to the modifying operation. If this curved surface is one for which none of the references is set, the "CURVED SURFACE MODIFICATION" processing is terminated at this point. If the aforesaid references are set for this curved surface, on the other hand, the functions (reference-assigned functions) assigned by the set references, that is, the functions originally provided by the user using the CAD user customizing function 11, as mentioned before, are invoked (Steps S8 and S9).

If any other menu items than "CREATION OF LINEAR GRAPHIC FORM," "CREATION OF CURVED SURFACE," and "MODIFICATION OF CURVED SURFACE" are selected, processings for these selected items are executed (Step S10).

When "END" is selected from the menu (Step S11), the processing by the CAD system 1 terminates. Among the processings described above, ones other than those of Steps S8 and S9 are the same processings as in the conventional case. The same processings as those of Steps S8 and S9 are also executed in Steps S3, S4, S5 and S10 with every input.

In FIG. 6, only the modification of the curved surface relating to the present invention is illustrated, and others are omitted.

Usually, it is the CAM system 2 that makes the cutter path computation for machining the curved surface defined (Steps S3, S4 and S5) by the processor of the CAD system 1 and originates the NC data.

Figure 7:
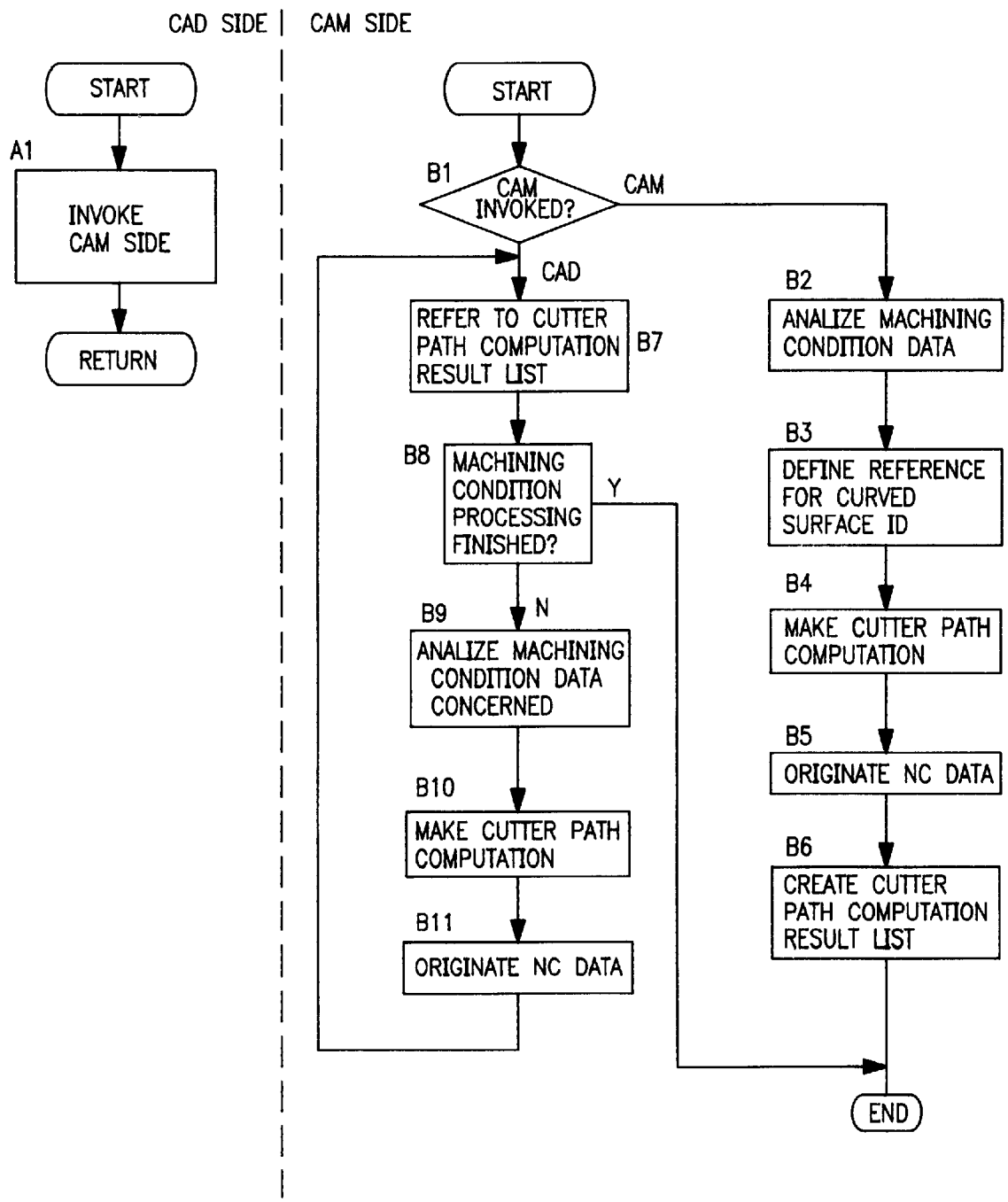
FIG. 7 is a flow chart showing processings for cutter path creation and NC data origination by a CAM system 2 and processings for cutter path creation and NC data origination, following curved surface modification, by the CAD system 1.

FIG. 7 is a flow chart showing processings for cutter path creation and NC data origination by the CAM system 2, and processings for invoking the functions assigned by the references set through the screen of the CAD system 1 and for the cutter path re-creation on the CAM side responsive to the invocation.

First, in executing the cutter path computation and NC data origination for a curved surface newly created by the CAD system 1, the CAM system 2 assigns data for the curved surface according to the ID code of the curved surface by invoking the curved surface data from the CAD system. Subsequently, the CAM system 2 sets machining conditions, such as the tool feed speed, starting point for cutting, pitch, tool shape, cutting path pattern, etc., through a CRT screen of the CAM system 2 shown in FIG. 4(b), for example. Then, a processor of the CAM system 2 determines whether the curved surface is invoked by the CAM system 2 itself or from the CAD system 1 (Step B1).

In the aforesaid case of the cutter path computation and NC data origination for the newly created curved surface, the curved surface data are invoked from the CAD by the CAM system 2 itself, so that the program first proceeds from Step B1 to Step B2, whereupon the data for the machining conditions set by the CAM system are analyzed.

Then, a reference is set for this newly created curved surface in order to later assign a function to be invoked when that curved surface is subject to modification later, so that cutter path re-origination processing can be executed based on the data of that modified curved surface. Further, the set references is delivered to the CAD system 1 to be stored in the memory M1 of the CAD system 1 (Step B3).

As in the conventional case, the cutter path is computed, and the NC data are originated by applying the set machining conditions to the curved surface data (Steps B4 and B5). Then, a cutter path computation result list is created and stored in the memory M2 of the CAM system 2 (Step B6). This cutter path computation result list is stored with machining condition data names for each curved surface ID to be machined.

Every time the processings for the cutter path computation and the NC data origination for the curved surface are finished in this manner, the memory M2 of the CAM system 2 is stored with the NC data and the cutter path computation result list, as well as with the corresponding machining condition data. Moreover, the memory M1 of the CAD system 1 is stored with the references which are set to assign the functions to be invoked for the cutter path computation and the NC data re-origination on the basis of data of the modified curved surface when the curved surface with the NC data thus originated is subjected to later modification. The references constitute the data base of the CAD system 1.

On the other hand, when a specific curved surface is modified by the CAD system 1, that is, when the modification completion is inputted after the aforesaid processings of Steps S6 and S7 of FIG. 6 are executed, the processor of the CAD system 1 determines whether or not the aforesaid references for the curved surface concerned are set in the memory M1 of the CAD system (i.e., whether or not the references are set in Step B3 in newly creating the curved surface) (Step S8). If it is concluded that the references are set for the curved surface as the object of this modification processing, functions assigned by these references are invoked by the CAD system (Step S9).

Since the functions invoked by the above references are intended to cause the CAM system 2 to re-create the cutter path in accordance with the modified curved surface data, the CAD system 1 invokes the CAM system 2 (Step A1 of FIG. 7) to cause the processor of the CAM system 2 to start the processing of Step B1 of FIG. 7 and the subsequent processings for the cutter path re-creation.

Accordingly, the processor of the CAM system 2 concludes that the invocation is from the CAD system 1 (Step B1), and then proceeds to Step B7. Thereupon, referring to the cutter path computation result list stored in the memory M2 of the CAM system, the CAM processor determines whether or not all the processings based on the cutter path machining condition data stored in the list are finished (Step B8). If it is concluded that all the processings are not finished, the machining condition data read out from the memory M2 of the CAM system 2 are analyzed, and the cutter path computation is executed for the modified curved surface, whereby the NC data are originated (Steps B9 to B11). The memory M2 of the CAM system is stored with the NC data for the re-origination according to the unmodified ID code. Thus, in the memory M2 of the CAM system, the initially stored NC data for the unmodified curved surface are updated to be NC data for latest modified curved surface.

Subsequently, the processor of the CAM system 2 repeatedly executes the aforesaid processings of Steps B7 to B11 until the cutter path computation and the NC data origination based on the machining condition data stored in the cutter path computation result list are finished. When all the processings based on the machining condition data are finished, the cutter path computation for curved surface modification and the NC data origination are finished.

Figure 5A:
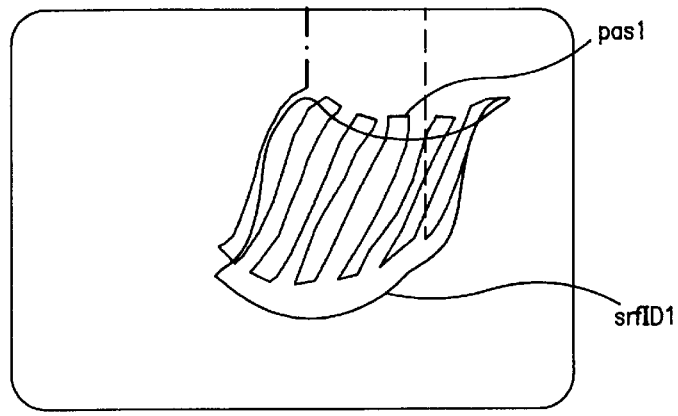
FIGS. 5a–5c are diagrams for illustrating the relationships between a shape modified by means of the CAD system and the cutter path.
Figure 5B:
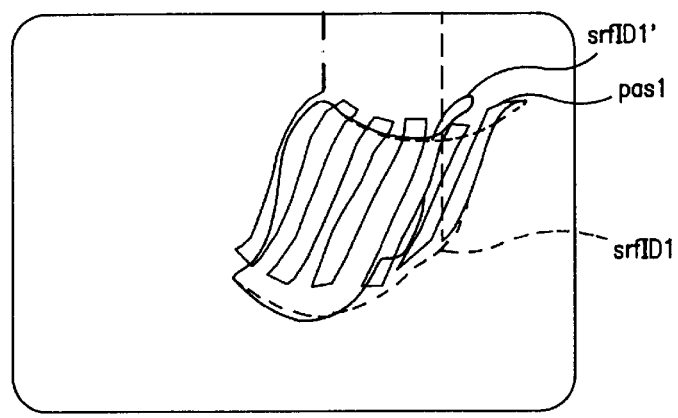
Figure 5C:
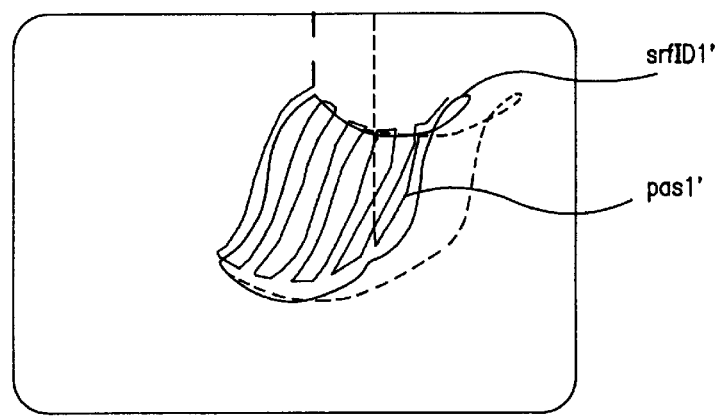

Referring to FIG. 5, the above processings will be described. When the curved surface srfID1 shown in FIG. 5(a) is modified into a curved surface srfID1' as indicated by full line in FIG. 5(b), cutter path computation for the modified curved surface srfID1' is executed, under the same machining conditions as those used before the modification, following the aforementioned procedure, whereby cutter path data (NC data) are re-originated. If a cutter path pas1' obtained by this re-origination is then displayed by being superposed on the screen with the modified curved surface srfID1' displayed thereon, the shapes of the two curved surfaces can be compared with each other, as shown in FIG. 5(c).

According to the present invention, as described above, when the screen data are modified on the CAD system side, the functions created by utilizing the customizing function of the CAD system are invoked by the references previously set on the CAD screen, whereupon the CAM side can be informed that the screen modification has been executed on the CAD side. Thus, the cutter path re-creation processing is executed by the CAM system immediately when the screen data are modified by the CAD system, so that a high operating efficiency can be enjoyed.

We claim:
1. A CAD/CAM system comprising a CAD system for defining a curved surface, and a CAM system for computing a cutter path corresponding to the curved surface and originating NC data,
said CAD system comprising:
means for executing a customizing function including first functions to assign ID codes to the curved surface and to each curved surface element of the curved surface, and second functions to automatically invoke the CAM system for the execution of a cutter path re-creation processing in response to key-input modification of the curved surface;
first memory means for storing data of the curved surface and the curved surface elements, with respectively corresponding ID codes, and for storing references set for the curved surface corresponding to the second functions;
means for determining, in response to the key-input, whether or not the references are set in the first memory means; and
means for automatically invoking the second functions assigned by the references, to thereby automatically invoke the CAM system, if the determining means concludes that said references are set; and
said CAM system comprising:
second memory means for storing a cutter path computation result list, the originated NC data, and machining condition data; and
means, responsive to the automatic invoking means of the CAD system, for reading out the machining condition data from the second memory means and automatically re-originating the NC data by executing the cutter path re-creation processing invoked by the second functions assigned by the references, and updating the re-originated NC data for storage in the second memory means.

2. A CAD/CAM method for executing an automatic re-creation processing for a cutter path, comprising the steps of:
(a) providing functions to be invoked for a cutter path re-creation in a CAM system by a customizing function device attached to a CAD system;
(b) storing machining condition data in the CAM system to execute a cutter path creation processing by the CAM system for a curved surface defined by the CAD system, selectively setting references to the curved surface for assigning the functions to said curved surface, and storing said set references in said CAD system;
(c) determining whether or not the references for the curved surface are set in the CAD system when the curved surface is modified in the CAD system and upon completion of an input requesting modification;
(d) automatically invoking the functions assigned by the references to thereby cause the CAD system to automatically invoke the CAM system, when said references have been set for the curved surface as an object of the modification as determined at said determining step (c);
(e) in response to the automatic invoking of the functions, the CAM system automatically executing a processing for cutter path re-creation assigned by the functions for the modified curved surface; and
(f) updating and storing NC data originated by the cutter path re-creation processing in the CAM system in accordance with an ID code for the unmodified curved surface.

3. A CAD/CAM system for automatically re-creating a cutter path, comprising:

means for storing machining condition data when a cutter path is computed and NC data are originated by a CAM system for shape created by a CAD system;

judging means for judging if said shape is an object of NC data origination;

means for automatically setting commands for a re-computation of the cutter path and a re-origination of the NC data in said CAM system, when said CAD system executes a modification of the shape which was discriminated by said judging means as an object of NC data origination and said CAD system informs said CAM system of said modification; and means for instructing said CAM system to automatically execute the re-computation of the cutter path and the re-origination of the NC data for the modified shape based on said stored machining condition data for said shape.

4. A system including a CAM system and a CAD system for automatic re-creation of a cutter path, said CAM system comprising:

means for receiving an ID code corresponding to a curved surface created by said CAD system;

means for automatically invoking curved surface data from said CAD system which corresponds to the received ID code;

means for setting machining conditions, which thereby create a cutter path, corresponding to the curved surface;

means for automatically setting references to be used by said CAD system during modification of the cutter path and delivering the references to said CAD system; and means for sequentially updating the set machining conditions, said CAD system comprising:

means for determining if references corresponding to the curved surface are stored in said CAD system; and means for invoking the CAM system to update the machining conditions corresponding to the stored references when the curved surface is modified by said CAD system.

5. The system according to claim 4, wherein the machining conditions include at least two of the group consisting essentially of tool feed speed, starting point for cutting, tool pitch, tool shape, and cutting path pattern.

6. The system according to claim 4, wherein the machining conditions include tool feed speed, starting point for cutting, tool pitch, tool shape, and cutting path pattern.

7. The system according to claim 4, wherein said CAM system illustrates the machining conditions on a CRT.

8. The system according to claim 4, wherein said CAM system includes a plurality of functions which respond to corresponding references in said CAD system to update corresponding machining conditions in said CAM system.

9. A system including a CAD system and a CAM system for automatic re-creation of a cutter path, said CAD system comprising means for creating a plurality of graphic elements; and means for receiving a reference to automatically invoke cutter path re-creation by said CAM system upon modification of a particular graphic element and selectively assigning the received reference to the particular graphic element, and said CAM system comprising means for creating a cutter path and computing NC data corresponding to the plurality of graphic elements; and means for creating and transferring the reference to said CAD system, wherein the reference automatically invokes the re-creation of the cutter path.

10. The system according to claim 9, wherein said CAM system includes a plurality of functions which respond to corresponding references in said CAD system to update corresponding machining conditions in said CAM system.

11. The system according to claim 9, wherein said CAD system further comprises means for assigning ID codes to the plurality of graphic elements;

means for transferring the assigned ID codes to said CAM system, and said CAM system further comprises means for receiving the plurality of assigned ID codes from said CAD system;

means for invoking curved surface data from the CAD system which corresponds to the received ID codes;

means for setting machining conditions corresponding to the curved surface data for the ID codes, which thereby creates the cutter path.

12. The system according to claim 11, wherein the machining conditions include at least two of the group consisting essentially of tool feed speed, starting point for cutting, tool pitch, tool shape, and cutting path pattern.

13. The system according to claim 11, wherein the machining conditions include tool feed speed, starting point for cutting, tool pitch, tool shape, and cutting path pattern.

14. The system according to claim 11, wherein said CAM system illustrates the machining conditions on a CRT.

15. The system according to claim 11, wherein said CAM system includes a plurality of functions which respond to corresponding references in said CAD system to update corresponding machining conditions in said CAM system.

16. A CAD/CAM system comprising a CAD system for defining a curved surface, and a CAM system for computing a cutter path corresponding to the curved surface and originating NC data, said CAD system comprising:

means for selectively assigning references to the elements of the curved surface, wherein the selectively assigned references automatically invoke cutter path re-creation processing by the CAM system in response to modification of the corresponding elements;

memory means for storing the elements of the curved surface and the selectively assigned references; and means for transferring the selectively assigned references to said CAM system upon modification of the elements to thereby invoke the cutter path re-creation processing, and said CAM system comprising:

means for creating and transferring the references to the memory means of said CAD system; and means responsive to transfer of the references from said CAD system to automatically re-originate the NC data by executing the cutter path re-creation processing.

* * * * *

UNITED STATES PATENT AND TRADEMARK OFFICE
CERTIFICATE OF CORRECTION

PATENT NO. : 5,963,451
DATED : October 5, 1999
INVENTOR(S) : Masaki SEKI, et al.

It is certified that error appears in the above-identified patent and that said Letters Patent is hereby corrected as shown below:

Title Page
[75] Inventors: change "Suginami-ku" to --Tokyo--;
change "Hino" to --Tokyo--.

[73] Assignee: change "Yamanashi" to --Minamitsuru--;

Col. 2, line 45, after "srflD1", insert --,--;
line 47, after "2" insert --. If--.

Col. 4, line 59, after "user" insert --(--;
line 59, after "the" delete "(";
line 59, change "constructor" to --system--.

UNITED STATES PATENT AND TRADEMARK OFFICE
CERTIFICATE OF CORRECTION

PATENT NO. : 5,963,451
DATED : October 5, 1999
INVENTOR(S) : Masaki Seki, et al

It is certified that error appears in the above-identified patent and that said Letters Patent is hereby corrected as shown below:

Col. 5,
    line 35,    delete "the"; insert --the-- before "aforementioned".
    line 40,    insert --selected by its-- before "ID".

Col. 6,
    line 35,    delete "later";
    line 38,    change "references" to --reference--.

Col. 9, line 6,    after "for" insert --automatically--;
    line 24,    delete "automatically".

Signed and Sealed this

Twenty-fifth Day of April, 2000

*Attest:*

Q. TODD DICKINSON

*Attesting Officer*    *Director of Patents and Trademarks*